Figure 1:
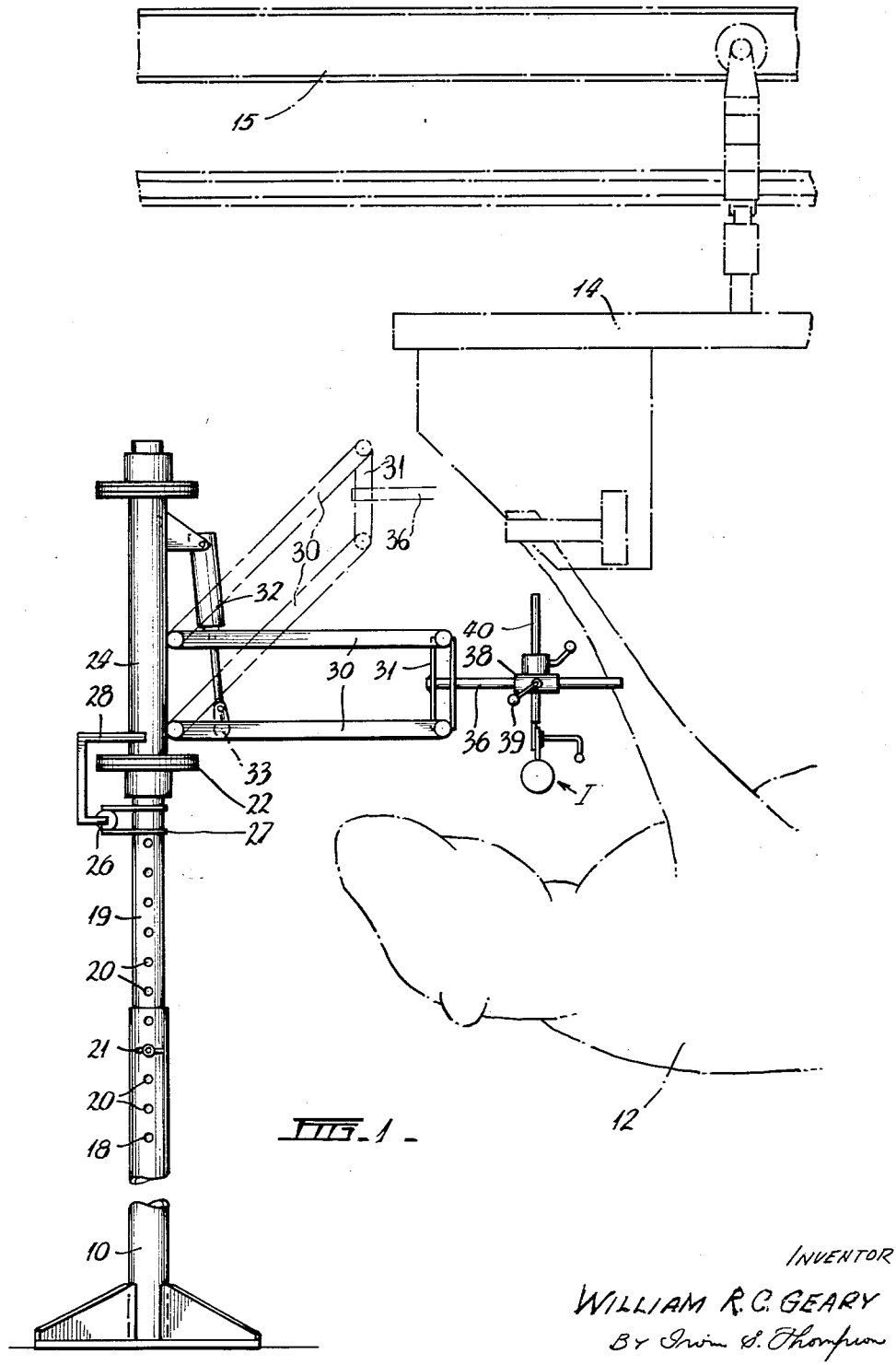

Feb. 25, 1964 W. R. C. GEARY 3,122,138
HYPODERMIC INJECTION APPARATUS
Filed June 26, 1961 4 Sheets-Sheet 1

INVENTOR
WILLIAM R. C. GEARY
By Irwin S. Thompson
ATTY.

Feb. 25, 1964 W. R. C. GEARY 3,122,138
HYPODERMIC INJECTION APPARATUS
Filed June 26, 1961 4 Sheets-Sheet 2

INVENTOR
WILLIAM R. C. GEARY
By Irwin S. Thompson
ATTY.

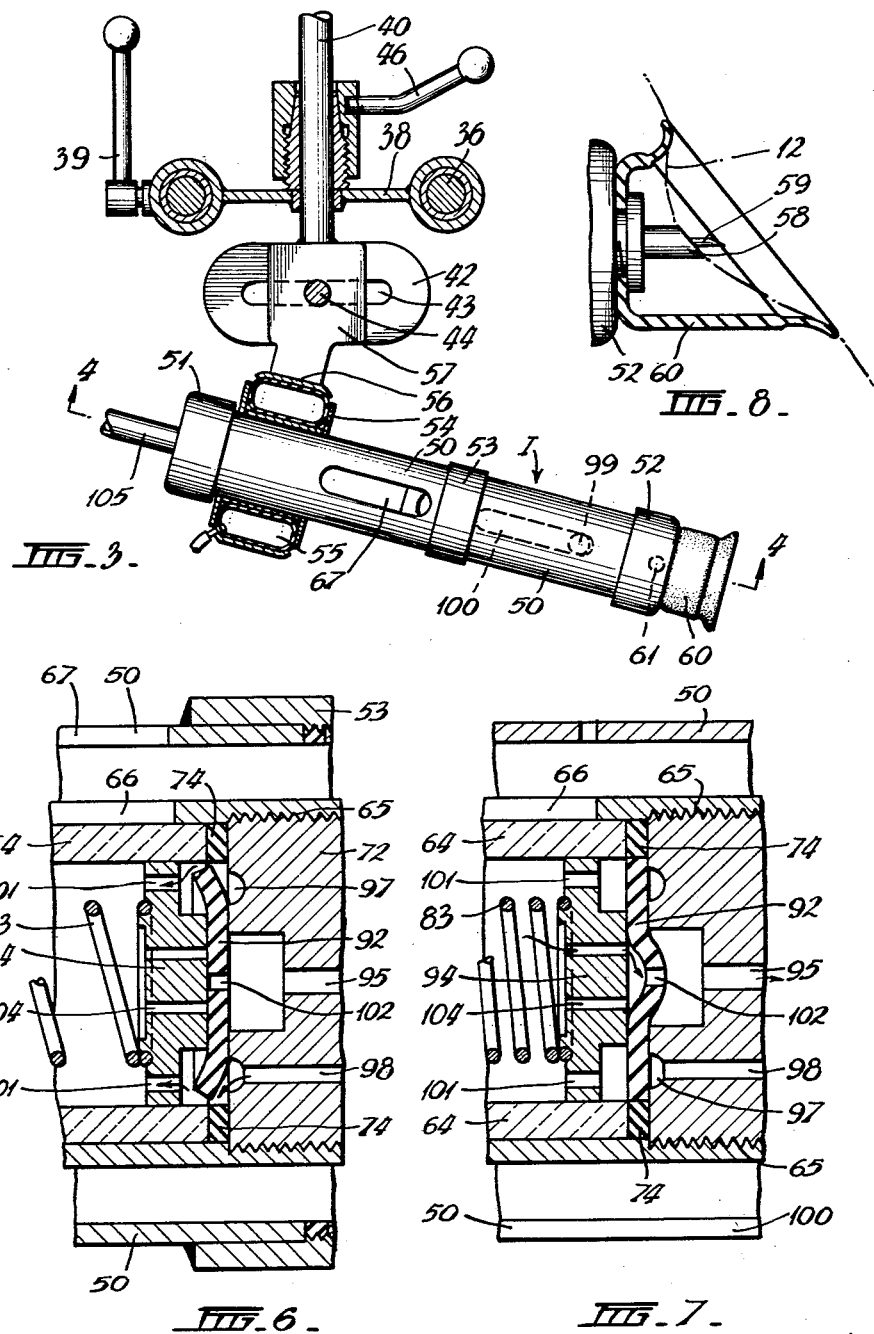

Feb. 25, 1964 W. R. C. GEARY 3,122,138
HYPODERMIC INJECTION APPARATUS
Filed June 26, 1961 4 Sheets-Sheet 4
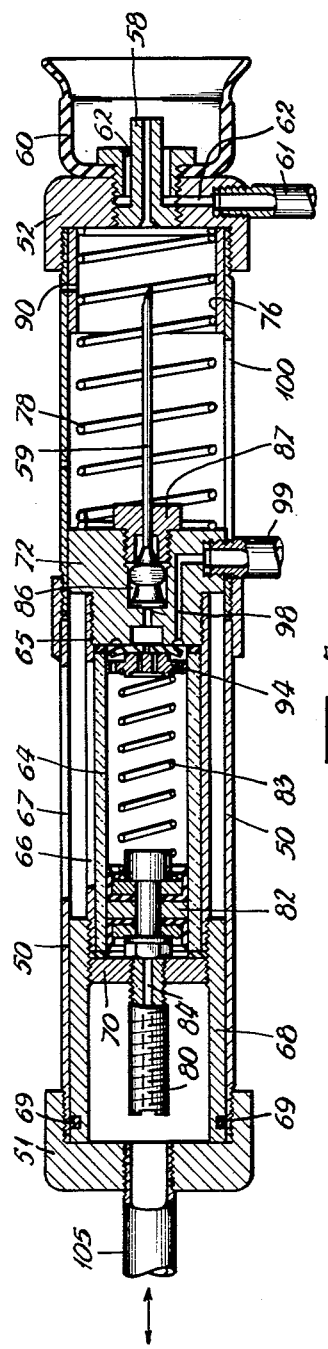
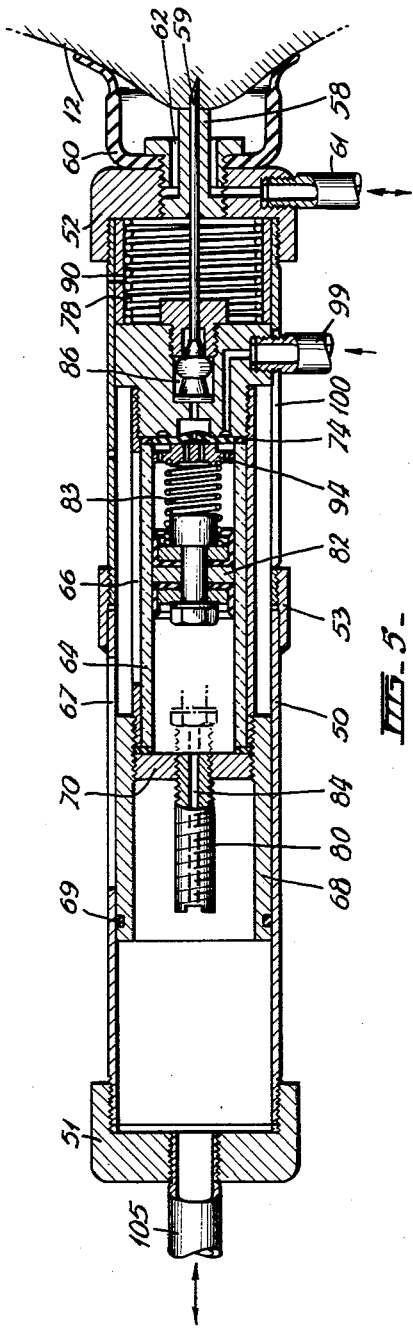
INVENTOR
WILLIAM R. C. GEARY
BY Irwin S. Thompson
ATTY.

3,122,138
HYPODERMIC INJECTION APPARATUS
William Richard Clifford Geary, 1A Bobley Court,
Moorabbin, Victoria, Australia
Filed June 26, 1961, Ser. No. 119,589
Claims priority, application Australia June 27, 1960
15 Claims. (Cl. 128—215)

This invention relates to apparatus for injecting fluids and has been devised primarily for the treatment of sheep and other animals though it is not confined thereto.

In the specification of my prior application No. U.S. 87,273 I have disclosed conveyor apparatus comprising carriages from which individual sheep are suspended by the legs in inverted condition and by which they are moved to a series of treatment positions. The present invention has been devised primarily for use in conjunction with such apparatus, but is not limited thereto.

The invention includes apparatus for use in injecting successive animals comprising, means for supporting and bodily moving a hypodermic syringe to and from an operative position, and means movable in unison with the syringe for locating engagement with the body of the animal to be injected.

Preferably the syringe is moved both laterally and downwardly from its inoperative position until the said locating means engage the brisket and the rear of the foreleg of an inverted animal thereby to locate the syringe in the requisite position to administer the injection behind the shoulder and in the bare area between the brisket and the foreleg.

The syringe is preferably movably supported by an air cushion while the injection is being administered.

The invention also includes an injection assembly comprising an axially reciprocable hypodermic syringe, a guide support therefor, means operable to reciprocate the syringe thereby to project and retract the needle thereof, means whereby the syringe plunger is operable after the needle has been projected thereby to administer an injection, and means whereby injection fluids passes into the forward end of the syringe barrel during each rearward movement of the plunger thereof.

More particularly the said guide support preferably comprises an air cylinder having the syringe arranged concentrically therein and carried by a plunger reciprocatingly mounted in the cylinder and provision is made for pneumatically actuating the syringe plunger after the syringe has been bodily displaced to insert the needle.

Preferably a suction cup is so arranged at the forward end of the assembly, that the needle when projected extends thereinto, provision being made for withdrawing air from the cup after its open forward end is pressed against the body of an animal. Preferably the syringe needle, when retracted, is accommodated within a sterilising or disinfecting compartment.

The said injection assembly may be held in the hand of an operator or alternatively it may be supported and bodily moved by apparatus of the aforesaid kind.

Still other features of the invention are set forth in the following description of a preferred form of apparatus according to the invention and in which reference is made to the accompanying drawings wherein—

Figure 2:
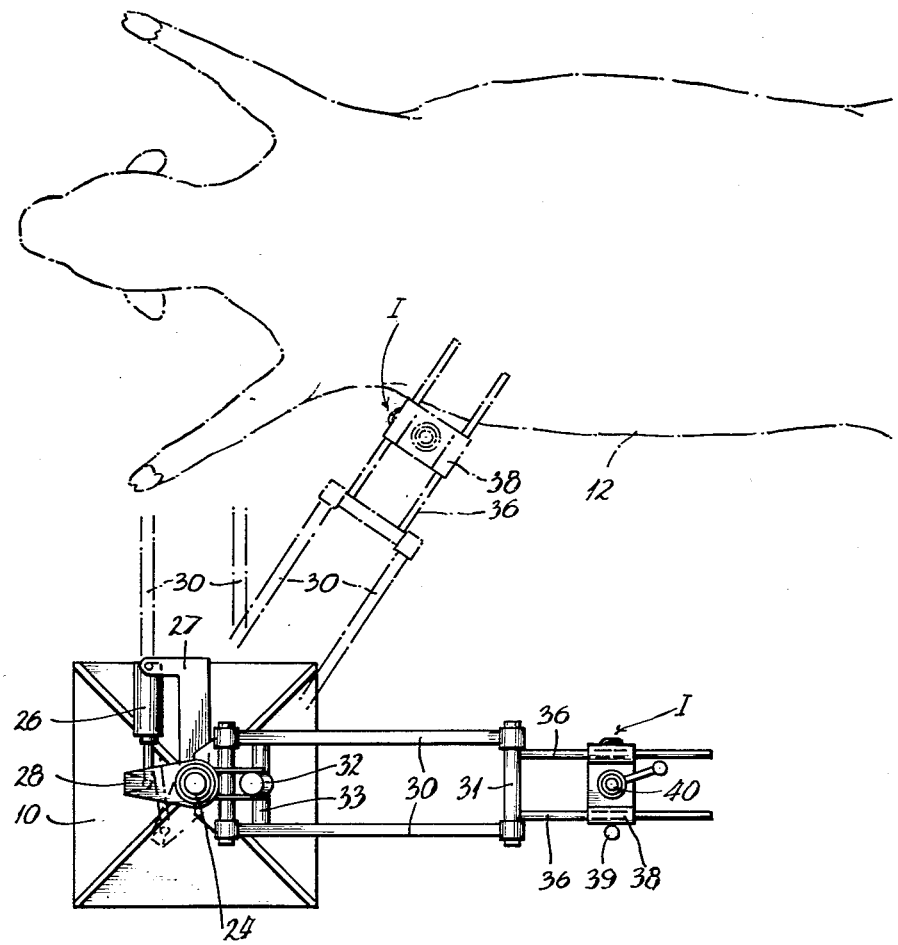

FIG. 1 is a view in elevation of apparatus for supporting and bodily moving an injection assembly, FIG. 2 is a view in plan, FIG. 3 is a view in sectional end elevation taken on the line 3—3 of FIG. 1, FIGS. 4 and 5 are views in longitudinal elevation of the injection assembly, FIGS. 6 and 7 are fragmentary sectional views drawn to a large scale and illustrating the operation of a valve, in the syringe, and FIG. 8 is a sectional view of a modified form of suction cup.

The movable carrier shown in FIGS. 1, 2 and 3 comprises a pedestal 10 arranged at one side of the path of movement of successive sheep 12 which are suspended in inverted condition by their legs below individual supporting carriages 14 mounted on an elevated endless track 15 as more fully disclosed for example, in my aforesaid prior specification. This pedestal supports a vertical telescopic column comprising a fixed lower tube 18 and an upper tube 19 which is slidably mounted therein and is arranged to be secured thereto in various alternative positions, in order to adjust the effective height of the column. For example, each tube may be provided with a spaced series of diametrical holes 20 through which a locking pin 21 may be inserted.

A flange 22 secured to an intermediate portion of the upper slidable tube 19 forms a support for the lower end of a sleeve 24 on the said tube, and means are provided for imparting limited angular movements to this sleeve. The means illustrated for this purpose comprises an air cylinder unit 26 which is pivotally connected at one end to a radial abutment 27 o nthe column tube 19 and at its other end to a downward extension of a radial arm 28 on the sleeve.

The sleeve 24 carries a parallel linkage which may comprise two laterally spaced pairs of arms 30 arranged one pair above the other and projecting outwardly from the column. The outer ends of these arms are pivotally connected to a vertically disposed plate 31, the arrangement being such that the said arms may be raised and lowered in unison while maintaining the plate vertical at all times.

The parallel arms are raised and lowered in unison by means of a further air cylinder unit 32 which is pivotally connected at its upper end to lugs projecting laterally from an upper portion of the sleeve 24 while its lower end is pivotally connected to a cross bar 33 connecting the lower pair of parallel arms.

Consequently, the vertical plate at the outer end of the parallel arms may be raised and lowered by the air cylinder unit 32. Additionally, it may be swung in a horizontal arc about the axis of the column by means of the first-mentioned air cylinder unit 26 while finally, the mechanism may be bodily raised and lowered by adjusting the effective height of the telescopic column.

The said vertical plate 31 is fitted with two laterally spaced parallel guide rails 36 which project horizontally outwards therefrom and serve to support a slide 38 provided with a suitable clamp 39 by which it may be rigidly secured to the rails in any required adjustment position.

The slide 38 is provided with a central boss for vertical slidable rod 40 which extends below the slide and terminates at its lower end in a laterally extended head piece 42 formed with an elongated horizontal slot 43 for a transverse attachment bolt 44 by which a holder for an injection assembly generally designated "I" is secured thereto.

The vertical rod 40 carrying the injection assembly may thus be raised and lowered relatively to the slide 38 and may also be turned about its vertical axis, and a suitable clamp 46 is provided for securing it to the slide in any required adjustment position.

Likewise, the aforesaid attachment bolt 44 for the injection assembly may be adjusted lengthwise of the horizontal slot in the head piece to impart a corresponding adjustment to the assembly, while in addition, the latter is angularly adjustable about the horizontal axis of the bolt. The injection assembly is thus universally adjustable.

The aforesaid holder for the injection assembly comprises an open-ended support ring 56 provided with an upwardly projecting lug 57 for engagement by the said bolt 44. A bobbin shaped member 54 is arranged centrally within the ring 56 and an annular pneumatic bag 55 formed of rubber or the like is mounted on the bobbin and within the ring 56. The central tube of the bobbin is adapted to receive and firmly grip the rear end of the injection assembly which is thus readily detachable therefrom.

The annular rubber bag 55 when fully inflated bears firmly at its ends against the flanges of the bobbin 51 while its inner periphery tightly grips the central tube thereof and its outer periphery is similarly forced against the support ring 54 so that the injection assembly is firmly held in the required attitude. When, however, the bag is partly deflated as hereinafter described the assembly is movable relatively to the support ring while still being retained thereto.

In operation the sheep supporting carriages 14 are preferably moved intermittently along the monorail track 15 whereby each animal is stopped in succession opposite to the movable carrier for the injection assembly as shown in FIG. 2. Shortly before each carriage stops in that position it preferably operates a suitably located valve which controls a further valve for directing compressed air into the two air cylinder units 26 and 32. The plunger rod of the unit 26 is thus projected to swing the parallel linkage arms 30 of the carrier in the anticlockwise direction in FIG. 2, while simultaneously the plunger rod of the unit 32 is projected to lower the arms 30 from their normal elevated positions shown in broken lines in FIG. 1.

These two movements thus occur in unison and the lateral movement continues until the leading rail 36 engages the back of the adjacent foreleg of the animal and the descending movement continues until the said rails or one of them rests on the brisket of the animal at which time the forward end of the injection assembly is pressed against the body of the animal behind the shoulder and in the bare area between the brisket and the foreleg.

The injection is then administered as hereinafter described after which the movable carrier is operated in the reverse direction to return the injection assembly to its original position in readiness for the next succeeding operation.

The rails 36 thus serve also as locating members for the injection assembly and it is unimportant whether the lateral or the vertical movement is completed in advance of the other.

The injection assembly "I" shown in FIGS. 3 to 7 inclusive comprises an elongated tubular casting 50 provided with screw-threaded end caps 51 and 52 and this casing consists of two coaxial tubes which are detachably connected by a threaded ring to facilitate replacement of the needle 59 of the syringe hereinafter described.

The cap 52 at the forward end of the tubular casing 50 is fitted centrally with a guide plug 58 provided with an axial clearance hole for the needle 59 of a hypodermic syringe.

The plug 58 is formed between its ends with a flange by which a suction cup 60 is clamped against the cap 52 and a suction tube 61 communicates with the interior of the cup through passages 62 formed partly in the cap and partly in the plug which latter projects some distance into the cup.

When the suction cup is moved into contact with the body of a sheep and air is withdrawn therefrom as hereinafter described, the skin of the animal is drawn into the cup and into contact with the end of the plug 58 shortly before the needle 59 is projected to a predetermined distance as shown in FIG. 5. If it is desired to insert the needle obliquely into the animal the shape of the suction cup is preferably modified as shown in FIG. 8. In either case, the suction cup is preferably substantially rigid with the exception of the flared mouth portion thereof so as to prevent excessive penetration of the needle.

The syringe is arranged concentrically within the tubular casing and comprises a glass barrel 64 arranged within a protective metal tube 65 formed with a longitudinal sight slot 66 for the operator, a corresponding slot 67 being formed in the casing 50.

The rear end of the tube 65 has a threaded engagement with the forward end of a tubular plunger 68 slidably mounted within the casing 50 which serves as an air cylinder and this plunger is provided with a sealing ring 69 and also with a disc 70 which forms a closure for the rear end of the syringe barrel 64.

The forward end of the syringe barrel is closed by a head member 72 and interposed sealing ring 74. This head member has a threaded engagement with the protective tube 65 and is enlarged in diameter at its forward end so as to be a free sliding fit within the casing 50.

The forward movement of the plunger 68 and syringe within the tubular casing is limited by a stop sleeve 76 arranged within the forward end of the casing for engagement by the head member 72 and the latter is continuously urged rearwardly by a spring 78.

An axially disposed screw-threaded stop rod 80 mounted in the closure disc 70 at the rear end of the syringe projects a variable distance into the barrel 64 so as to limit the return movement of the syringe plunger 82 and enable the injection dosage to be regulated. The plunger 82 is continuously urged rearwardly by a spring 83 in the forward end of the barrel, while it is forced forwardly in opposition to the spring by compressed air which is supplied to the rear end of the barrel through a small axial passage 84 in the stop rod as hereinafter described. The plunger 82 is thus normally maintained in abutting engagement with the stop rod 80 by the spring 83.

The forward end of the head member 72 of the syringe is formed with an axial socket 86 for the enlarged base of the needle 59 which is held firmly in position by a screw plug 87.

The forward end of the casing 50 may form a sterilising compartment in which the point of the needle is accommodated when it is retracted as shown in FIG. 4 and this compartment may contain a pad of cotton gauze or the like to which a sterilising liquid or mist is continuously or intermittently supplied to the compartment through an inlet hole 90 in the top of the casing and a similar drain hole may be provided in the lower side thereof.

A flexible valve disc 92 arranged at the forward end of the syringe barrel is held in contact with the inner end of the head member 72 by a flanged disc 94 which forms an abutment for the forward end of the plunger spring 83.

The valve disc normally closes the adjacent inner end of an axial passage 95 formed in the head member 72 for the discharge of liquid from the barrel 64 into the needle, while the periphery of the said disc normally covers and seals an annular groove 97 provided in the inner end of the head member. This annular groove communicates by a passage 98 in the head member with an injection fluid supply pipe 99 which projects radially therefrom through an elongated clearance slot 100 in the adjacent part of the casing 50.

The outer peripheral portion of the flanged disc 94 is spaced from the valve disc 92 and is formed with a series of holes 101 through which the fluid may pass into the syringe barrel. The central forwardly projecting portion of the disc 94 normally covers and seals a small central hole 102 provided in the valve disc 92 and communicating with the adjacent enlarged end of the passage 95 in the head member. In addition the disc 94 is provided with a series of holes 104 disposed adjacent to but out of register with the central hole 102 in the valve disc.

The action of the valve is illustrated in FIGS. 6 and 7. The injection fluid in the supply pipe 99 is maintained under a constant pressure so that during each rearward or suction stroke of the syringe plunger 82, the pressure of the fluid lifts the rim of the valve disc 92 so that the fluid passes into the barrel through the holes 101 in the disc 94 as shown in FIG. 6. At this time the greater pressure on the outer face of the central portion of the valve disc presses the latter firmly against the disc 94 so that the central hole 102 in the valve disc is closed. The retracting movement of the syringe plunger continues until it abuts against the inner end of the hollow stop rod 80 projecting into the rear end of the barrel.

As the syringe plunger 82 commences each forward stroke, the liquid in the forward end of the barrel is subjected to pressure so that the rim of the valve disc is forced against the head member 72 thus closing the annular groove 97 therein. Also the pressure exerted on the central portion of the valve disc by the liquid in the holes 104 near the centre of the flanged disc 94 forces the valve disc into the enlarged inner end of the central discharge passage 95 in the head member. The liquid is thus expelled from the barrel 64 through the holes 104 and then through the centre of the valve disc to the discharge passage 95 as shown in FIG. 7.

In use, the tube 61 is normally connected to a source of air under pressure so that when the suction cup 60 is moved into sealing contact with an animal the pressure within the cup is momentarily increased. This increase in pressure is caused to actuate a pressure responsive valve which operates to connect the tube 61 to a source of reduced pressure and also to connect the rear end of the casing 50 to the source of compressed air through an axial tube 105. The reduction of pressure in the suction cup causes the skin of the animal to be drawn into the cup and into contact with the needle guide plug 58 as shown in FIGS. 5 and 8. The compressed air supplied to the rear end of the tubular casing 50 through the pipe 105 causes the plunger 68 to be forced forwardly in opposition to the spring 78 and as the syringe is connected to this plunger it is moved bodily forwards within the casing until it is arrested by the stop sleeve 76 at which time the needle 59 has been projected to its full extent and has penetrated the animal to the required depth.

The rear end of the barrel of the syringe communicates with the rear end of the tubular casing through the hollow stop rod 80, but the pressure required to force the syringe plunger forwardly in opposition to its spring 83 is substantially greater than that required to move the syringe bodily. Thus when the syringe completes its forward movement as described, the air pressure builds up until the syringe plunger is forced forwardly to its full extent whereby the injection is administered.

At this stage a pneumatic or other timing valve again connects the suction cup to the compressed air source and also reverses the air valve in the pipe line 105 leading to the rear end of the casing 50 so that the latter is connected to exhaust. Thus the springs 78 and 83 return the syringe and the plunger of the latter to their normal retracted positions. As the syringe approaches its fully retracted position the tip of the needle 59 enters the sterilising compartment while during the return of the syringe plunger 82 a further measured dose of the injection fluid enters the syringe barrel 64 as previously described.

The described injection assembly may be used manually and provides advantages over the usual manual injection procedure, as among other things it requires the use of one hand only thus leaving the other hand free for other purposes such as for restraining the animal. Also the needle is inserted to a predetermined depth only and is automatically sterilised after each injection. When used in this way the supply of compressed air and the connection of the suction cup to the vacuum pump may, if desired, be controlled manually. The aforesaid advantages also render the injection assembly suitable for the treatment of human beings especialy when large numbers of people are to be treated in succession.

When used for the treatment of animals however, the injection assembly is preferably mounted on the locating apparatus shown in FIGS. 1 and 2 so that the entire operation is carried out automatically and when this is done the aforesaid timing valve also preferably controls the reverse operation of the aforesaid valve by which compressed air is delivered to the air cylinder units 26 and 32 of the locating apparatus. That is to say when the timing valve operates after each injection has been administered, the locating apparatus automatically returns to its inoperative position. Also when the locating apparatus is used the aforesaid pressure responsive valve associated with the line 61 leading to the suction cup, also preferably serves, when operated, to cause the annular rubber bag 55 of the holder to be partly deflated so that the injection assembly is free to follow any body movements of the animal.

I claim:

1. In combination with a hypodermic syringe, apparatus for supporting and bodily moving a hypodermic syringe for the purpose of injecting an animal disposed adjacent thereto, comprising angularly movable means arranged to move the syringe in a substantially horizontal arc, means operable to raise and lower the syringe and locating means on said last-mentioned means engageable with the rear of a foreleg, and with the brisket or adjacent part of the animal, thereby to locate the syringe in a predetermined position relatively thereto.

2. Apparatus for supporting and bodily moving a hypodermic syringe for the purpose of injecting an animal disposed adjacent thereto comprising, a support, a substantially parallel linkage projecting outwardly from and pivotally mounted on the support for movements about a substantially vertical axis, the said parallel linkage comprising at least two transversely pivoted arms arranged one above the other and a member pivotally connecting outer portions thereof, whereby the latter may be raised and lowered by the said arms, and including animal engaging and syringe supporting means projecting outwardly from the connecting member, means operable to move said parallel linkage forwardly and rearwardly about the said vertical pivotal axis and means operable to raise and lower the said arms about the transverse axes at the inner ends thereof, thereby to locate the syringe both horizontally and transversely with respect to an animal to be injected.

3. Apparatus according to claim 2 wherein said means for supporting the syringe is adjustable horizontally, vertically and angularly.

4. Apparatus according to claim 2 wherein said means for moving the parallel linkage forwardly and rearwardly comprises an air cylinder unit and said means for raising and lowering the said arms of the linkage comprises a second air cylinder unit.

5. Apparatus according to claim 2 wherein said means for supporting the syringe comprises a guide member projecting outwardly from said connecting member, a slide adjustably secured to the said guide member, a vertically adjustable member secured to the slide and a syringe holder secured to the vertically adjustable member below the slide and so as to be adjustable angularly with respect thereto.

6. An injection assembly comprising a tubular casing forming a cylinder, a plunger slidably mounted therein, a hypodermic syringe comprising a barrel, a plunger therein and a needle, said hypodermic syringe being arranged concentrically within the casing and being secured to the plunger so as to move in unison therewith, a spring urging the firstmentioned plunger and syringe rearwardly within the casing whereby the syringe needle is normally retracted, a guide member at the forward end of the casing through which the needle projects when the syringe is moved forwardly to its full extent, adjustable stop means for limiting the rearward movement of the syringe plunger, a spring urging the lastmentioned plunger rearwardly, means forming an air passage communicating with the tubular casing behind said plunger therein whereby the latter may be forced forwardly in opposition to the firstmentioned spring, means whereby the syringe plunger may be forced forwardly by air pressure in opposition to the secondmentioned spring and means whereby injection fluid passes into the forward end of the syringe barrel during each rearward movement of the plunger thereof.

7. An injection assembly according to claim 6 having an air passage connecting the rear end of the syringe barrel with the rear end of the tubular casing whereby compressed air passes into the syringe barrel to force the plunger thereof forwardly and wherein the resistance to the forward movement of the syringe plunger exceeds the resistance to the forward movement of the syringe barrel whereby the needle is projected before the injection is discharged therethrough.

8. An injection assembly according to claim 6 wherein said adjustable stop means for limiting the rearward movement of the syringe plunger comprises an axially disposed screw threaded rod carried by the firstmentioned plunger and projecting a variable distance into the rear end of the syringe barrel.

9. An injection assembly comprising a tubular casing forming a cylinder, a plunger slidably mounted therein, a hypodermic syringe arranged concentrically within the casing and secured to the plunger so as to move bodily in unison therewith, said syringe comprising a barrel, a slidable plunger therein, and a needle, a spring urging the firstmentioned plunger rearwardly within the casing whereby the syringe needle is normally retracted, a guide member at the forward end of the casing through which the needle projects when the syringe is moved forwardly to its full extent, an axially disposed screw-threaded stop rod supported by the said firstmentioned plunger and projecting a variable distance into the rear end of the syringe barrel thereby to limit the rearward movement of the said slidable plunger therein, a spring urging the lastmentioned plunger rearwardly, means forming an air passage communicating with the tubular casing behind said plunger therein, whereby the latter may be forced forwardly in opposition to the firstmentioned spring, the said stop rod being formed with an axial air passage which connects the rear end of the syringe barrel with the rear end of the tubular casing whereby the syringe plunger is forced forwardly by air pressure in opposition to the secondmentioned spring, the resistance to the forward movement of the syringe plunger being greater than the resistance to the forward movement of the syringe whereby the needle is projected before the injection is discharged therethrough, and means whereby injection fluid passes into the forward end of the syringe barrel during each rearward movement of the plunger thereof.

10. An injection assembly according to claim 6 wherein the interior of the forward end of the tubular casing behind said needle guide member forms a sterilising compartment in which the needle tip is located when the syringe is fully retracted, and including means forming an inlet passage for supplying a sterilising agent to the said compartment.

11. An injection assembly comprising a tubular casing, an axially reciprocable syringe arranged concentrically therewithin, a guide member at the forward end of the casing through which the needle extends when projected, stops means arranged to limit the movements of the syringe in each direction, thereby to determine the projected and retracted positions of the needle, means whereby the syringe may be reciprocated within the casing, means whereby the syringe plunger may be reciprocated within the barrel therefor, means whereby injection fluid passes into the forward end of the syringe barrel during each rearward movement of the plunger therein, said means whereby the injection fluid passes into the forward end of the syringe plunger comprising a flexible valve disc arranged in contact with the inner face of a head member closing the forward end of the syringe barrel, a coacting member resiliently pressed against a central portion of the valve disc, and a fluid entry passage in said head member and terminating in said inner face thereof so as normally to be covered and sealed by the peripheral portion of the said valve disc, the said valve disc being formed with a central discharge passage which is normally closed by the said coacting member and the said coacting member being formed with at least one discharge passage spaced from said central passage in the valve disc, whereby the fluid may be forced against the inner face of the latter to press the central portion thereof into a discharge cavity disposed therebehind in said head member.

12. Apparatus for use in injecting animals, comprising a hypodermic syringe, movable supporting means therefor, means operable to actuate said supporting means thereby to move said syringe to and from an operative position near which the animals to be injected are successively positioned, means movable in unison with said supporting means for locating engagement with an animal arranged near said operative position thereby to locate the syringe correctly with respect to the animal, and means operable consequent upon such location of the syringe to actuate the latter thereby to administer an injection to the animal.

13. Apparatus according to claim 1 wherein said syringe supporting means includes an annular pneumatic bag through which the syringe is removably inserted and which forms a cushion therefor.

14. A hypodermic injection assembly comprising a tubular casing, an axially reciprocable syringe arranged therein, said syringe comprising a barrel, a plunger therein and a needle, stop means for limiting the movement of the syringe in each direction, means operable to reciprocate the syringe, means whereby the plunger is displaced to dischare injection fluid after the syringe has been moved forwardly to project the needle, a suction cup connected to the forward end of the tubular casing and adapted for sealing engagement with an animal to be injected, an abutment member projecting forwardly into the suction cup from the bottom thereof and having therein a neat clearance hole for the needle to project therethrough, and means forming an air passage communicating with the interior of the suction cup whereby air may be withdrawn therefrom after said suction cup sealingly engages an animal and wherein said abutment member is arranged for locating engagement by the animal's skin drawn into the cup when the pressure within the latter is reduced.

15. A hypodermic injection assembly comprising a tubular casing, an axially reciprocable syringe arranged therein, said syringe comprising a barrel, a plunger therein and a needle, stop means for limiting the movement of the syringe in each direction, means operable to reciprocate the syringe, means whereby the plunger is displaced to discharge injection fluid after the syringe has been moved forwardly to project the needle, a suction cup arranged at the forward end of the tubular casing for sealing engagement with an animal to be injected, said suction cup being also arranged so that the needle, when projected, extends through a neat clearance hole into the cup, valve means operable to connect the interior of the suction cup alternatively to a source of air under a super-atmospheric pressure and to a source of air under a sub-atmospheric pressure, and pressure responsive means operable to control said valve means thereby to connect the suction cup to said sub-atmospheric pressure source when the pressure in said cup increases after the latter sealingly engages an animal.

References Cited in the file of this patent

UNITED STATES PATENTS

| | | |
|---|---|---|
| 833,988 | Valerius | Oct. 23, 1906 |
| 2,701,566 | Krug | Feb. 8, 1955 |
| 2,743,723 | Hein | May 1, 1956 |
| 2,762,365 | Wagner et al. | Sept. 11, 1956 |
| 2,803,269 | Switzer | Aug. 20, 1957 |
| 2,823,674 | Yochem | Feb. 18, 1958 |
| 2,960,087 | Uytenbogaart | Nov. 15, 1960 |
| 3,016,897 | Kendrick | Jan. 16, 1962 |

FOREIGN PATENTS

| | | |
|---|---|---|
| 116,631 | Russia | Feb. 18, 1958 |